UNITED STATES PATENT OFFICE.

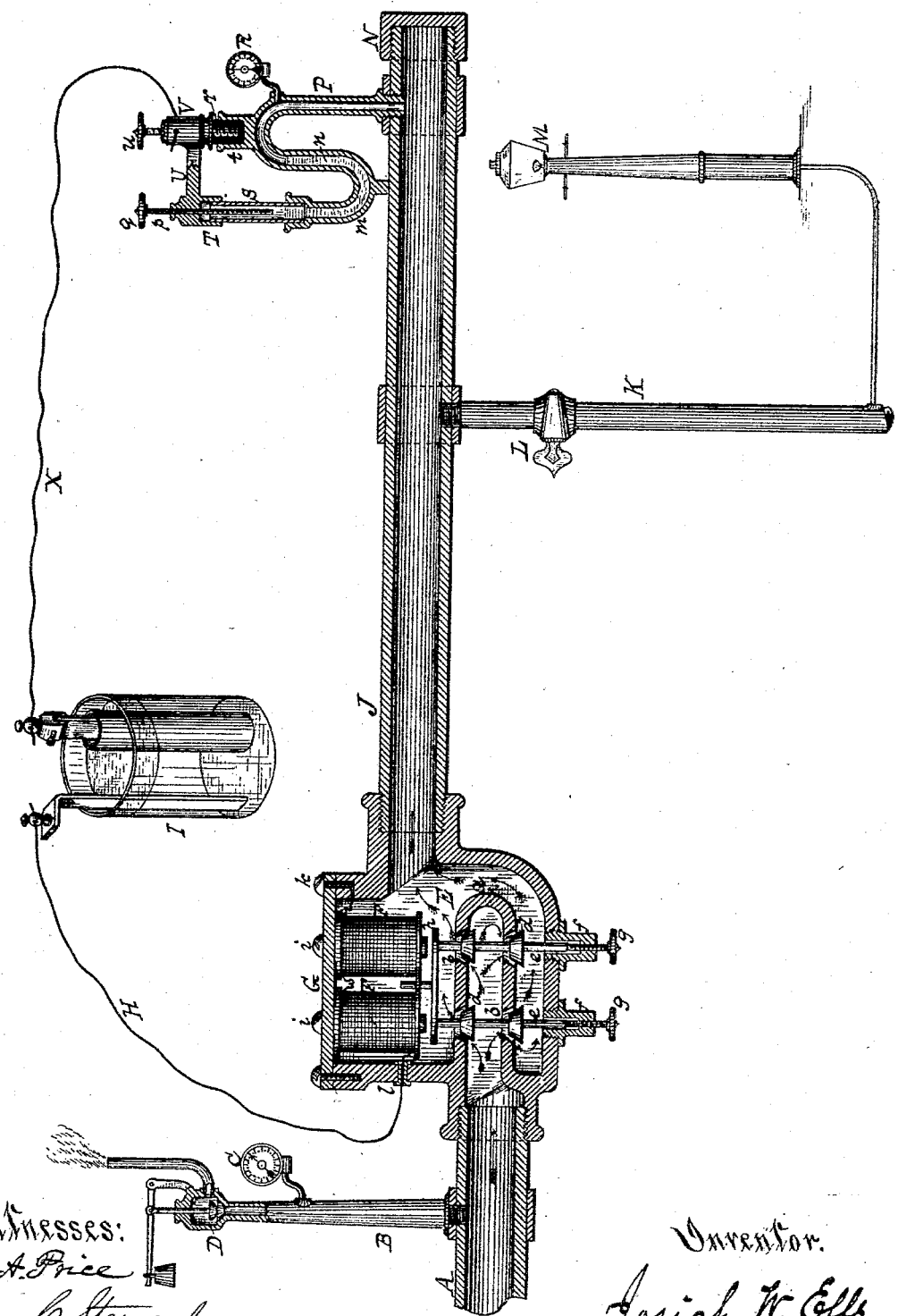

JOSIAH W. ELLS, OF PITTSBURG, PENNSYLVANIA.

MEANS FOR CONTROLLING GAS UNDER PRESSURE.

SPECIFICATION forming part of Letters Patent No. 321,426, dated July 7, 1885.

Application filed July 18, 1884. (No model.)

*To all whom it may concern:*

Be it known that I, JOSIAH W. ELLS, a citizen of the United States, residing at Pittsburg, in the county of Allegheny and State of Pennsylvania, have invented a new and useful Means for Admitting, Controlling, and Regulating Gas Under Pressure in Receiving and Distributing Pipes, which invention will be readily understood from the following description, taken in connection with the accompanying drawing, which represents, mostly in longitudinal section, such hereinafter-described parts of a contrivance designed by me to accomplish the object of my invention.

It is now generally known that in certain localities a light but very combustible gas may be obtained by simply boring into the earth a sufficient depth to reach its place of accumulation, which, when arrived at, gives vent to the gas and enables it to escape upward through the boring with wonderful force and enormous pressure. This gas is difficult to confine even with good wrought-iron pipe; and although it has been conveyed through such for miles to several manufacturing establishments and successfully used in their large furnaces, nevertheless at a normal pressure it is deemed unsafe for household purposes, for, owing to its peculiar character and force, it will readily pass through cast-iron of considerable thickness, and, therefore, should any leakage occur in or about a dwelling, this inodorous gas might enter the rooms unperceived by sense of smell and in such quantities as to make it absolutely dangerous before its presence became known; but, where the pressure of this gas, after leaving the well, has been so reduced as to enable ordinary pipes and fittings to hold it, the same may be introduced and used with perfect safety.

The object of my invention is to take this natural subterranean gas, under its enormous pressure of several hundred pounds to the square inch, from its receiving-pipe, and, by a system of well-contrived automatically-acting valves, transfer or cause it to enter one or more secondary distributing-pipes in just such quantities or volumes as shall be required to keep and maintain therein that degree or low pressure of gas as will make it safe and available for various domestic uses.

To this end, with a stout pipe, A, connected to and leading from a gas-well or other source of supply, and transmitting gas therefrom under great force and compression, I combine a stand-pipe, B, provided with a suitably-constructed gage, C, for correctly indicating the pressure of gas within, and also a relief-valve, D, for allowing the excess of gas, or that rising above a given limit, to escape and thus avoid all danger of bursting the pipe A containing the gas under such remarkable strain. To the end of this pipe A, be it near or remote from the well, is attached a valve-chamber, E, of suitable size and construction, its interior being properly contrived with a double division-wall, *a*, through which are bored conical valve-seats *b*, each fitted with a correspondingly-shaped valve, *d*, attached to and working in pairs on separate vertical stems *e*, in such a manner as not to be affected by any pressure of gas. These several valves are so arranged as to open downwardly by their own weight, each pair being guided in that respect by the lower end of its respective stem that extends into, and, when at liberty, is free to slide up or down within, a suitable guide-box, *f*, each provided with a thumb-screw, *g*, by which the valves may be properly adjusted either up or down, as the case may require.

Across and attached to the upper end of these valve-stems *e* is a short bar of soft wrought-iron, *h*, constituting an armature to an electro-magnet, F, arranged vertically, and rigidly secured in that position within and under the top G of the valve-chest E by means of two small screws, *i i*. The wire forming the electrical helix of the magnet is made to communicate with the valve-chamber E and its metallic connections by having one end thrust under and held fast by a screw, *k*, that serves with others to keep the top G of the chamber in place, and the other end of the wire H is passed through a suitable eyelet, *l*, of non-metallic substance, and extended from thence to and connected with one element of an electrical battery, I.

Permanently attached to the valve-chest E, and so as to receive gas therefrom, is a large general distributing-pipe, J, which may be of any length, and provided with as many branches K as are desirable, each fitted with a cock or valve, L, and connected to a streetlamp, M, or other means for the production of light or heat by the combustion of gas. The extreme end of this large distributing-pipe J, distant from the valve-chest E, is closed by a cap, N, near which a recurving-bent pipe, P, is firmly screwed into the distributing-main in such a manner as that their interiors shall at all times communicate with each other. This recurving pipe P is provided with an index or gage, R, whereby the pressure of gas at that point may be easily and readily known. The lower bend, $m$, of the recurving pipe P is made to contain as much water $n$ or other liquid matter as will form a perfect seal, having a range of action up or down within its part of the pipe proportioned to the pressure of gas thereon. The upwardly-extending end of this metallic recurving pipe P is fitted with a glass cylinder, S, the upper portion of which is supported by a small brass cap, T, down through the center of which and into the glass cylinder extends a long screw, $p$, that is provided with a suitable thumb-knob, $q$, at its top.

From the brass cap T on the glass cylinder an arm, U, projects horizontally to and forms part of a metallic post, V, that by an intermediate hard-rubber packing, $r$, is insulated and affixed in a socket, $t$, on top of the upper curve of the bent pipe P. This post V is provided with the usual binding-screw, $u$, and a transverse hole for the insertion of a wire, X, that extends therefrom and to the other element of the electrical battery I.

The several parts having been constructed in the manner shown and described, the operation is as follows: Upon the admission of gas from the well into the receiving-pipe A, it will with great force speedily reach and enter the valve chest E, and continue onward through the valve-passages into the great distributing-pipe J and all the branches thereof, soon filling them with a gradually-increasing pressure of gas, which, entering the recurvated pipe P, acts upon the column of water therein, forcing it around its lower bend, $m$, and up into the glass tube S, until it comes in contact with the end of the long screw $p$, whereupon an electrical current will be established through the battery by way of the wires X H and their intervening metallic connections, producing such instantaneous action or effect in the electro-magnets F as will cause them to attract the armature $h$, and thereby close the valves, and for the time shut off any further inflow of gas, and the valves will remain closed until the pressure in the distributing-pipe J has so decreased that the column of water $n$ will, in finding its level leave the point of the screw $p$, when the electrical circuit will be broken and the magnets cease to act, enabling the valves to fall open for the admission of more gas, which instantly takes place and continues until that in the distributing-pipe has again reached that degree of pressure which will establish the electrical circuit, and thereby close the valves, in the manner hereinbefore described; and the operation of opening and closing the valves will be repeated when and as often as may be necessary to maintain a regular required pressure of gas within the distributing-pipe and its branches at all times, whether the pulsating or moving contact for closing or opening the electrical circuit be situated fifty inches or fifty miles distant from the valves.

Having thus described my invention, its construction, and operation, I claim—

1. The combination consisting of a pipe leading from a gas-producing well, a valve-chest communicating with said pipe, a valve therein, with an electro-magnet for operating the same, a low-pressure pipe receiving gas through the valve-chest, one or more branch pipes extending therefrom to burners for the combustion of gas, a vessel containing water or other fluid matter attached to said low-pressure pipe, a wire from an electric battery connected thereto, and the electro-magnet whereby an increased pressure of gas within said pipe shall cause the fluid matter to come in contact with a metallic conductor of electricity, and thus make or establish its circuit or current through the electro-magnet.

2. The combination consisting of a pipe for conveying gas under great pressure from a well, a valve-chest communicating with said pipe, a valve therein, and an electro-magnet for operating the same, a receiving-pipe and branches extending therefrom to burners for the combustion of such gas, and a movable conductor of electricity actuated by a pressure of gas within the receiving and distributing pipe less than that contained within the high-pressure pipe.

JOSIAH W. ELLS.

Witnesses:
JNO. W. MACDONALD,
JAS. G. BELL.